United States Patent [19]

Patsiokas et al.

[11] Patent Number: 5,430,769
[45] Date of Patent: Jul. 4, 1995

[54] METHOD AND APPARATUS FOR CONTROLLING SWITCHED ANTENNA DIVERSITY SYSTEMS

[75] Inventors: Stelios J. Patsiokas, Plantation; Craig P. Wadin, Sunrise; Paul D. Marko, Ft. Lauderdale, all of Fla.

[73] Assignee: Motorola, Inc., Fort Lauderdale, Fla.

[21] Appl. No.: 980,056

[22] Filed: Nov. 23, 1992

[51] Int. Cl.⁶ ................. H04B 7/10; H04L 1/02
[52] U.S. Cl. ................. 375/347; 455/277.2; 455/135; 375/224
[58] Field of Search ............. 455/132, 133, 134, 135, 455/272, 277.1, 277.2; 375/100, 10

[56] References Cited

U.S. PATENT DOCUMENTS

| | | | |
|---|---|---|---|
| 4,174,502 | 11/1979 | Wilson et al. | 375/28 |
| 4,584,709 | 4/1986 | Kneisel et al. | 375/100 |
| 4,584,713 | 4/1986 | Bruckert et al. | 455/277 |
| 4,710,957 | 12/1987 | Bocci et al. | 375/94 |
| 5,127,025 | 6/1992 | Okanoue | 375/100 |

*Primary Examiner*—Stephen Chin
*Assistant Examiner*—Amanda T. Le
*Attorney, Agent, or Firm*—Pedro P. Hernandez; Daniel K. Nichols

[57] ABSTRACT

The present invention comprises a method and apparatus for selecting one of at least two antennas (202, 204) in a communication unit (200) for use in a wireless communication system (100). A signal is received by a radio frequency receiver during a receiving period from one of the at least two antennas (202,204) currently selected by an antenna switch (206), the signal having a plurality of bits. The receiver is capable of determining the quality of the receive signal by determining if the incoming bits transition periods fall within a predetermined time window. If it is determined by the receiver that the quality of the receive signal is below a predetermined threshold the currently selected antenna (202 or 204) is switched. The currently selected antenna remains selected when the currently selected antenna has been selected within a predetermined amount of time.

10 Claims, 4 Drawing Sheets

METHOD AND APPARATUS FOR CONTROLLING SWITCHED ANTENNA DIVERSITY SYSTEMS

TECHNICAL FIELD

This invention relates generally to wireless communication systems, and more specifically to a method and apparatus for performing antenna diversity in a wireless communication receiver.

BACKGROUND

Radio frequency communication receivers that support antenna diversity for overcoming some symptoms of multipath fading in a mobile environment are well known in the art. Examples of such receivers may be found in cellular mobile telephone systems. Other examples of such receivers may be found in systems such as those based on second generation digital cordless telephony (CT2) technology.

Some conventional radio communication receivers that support antenna diversity make the decision about which antenna should be used for receiving the incoming signal based upon received signal strength criteria. For example, whenever the received signal strength of the incoming signal falls below a predetermined level, the receiver switches to a different antenna in order to attempt to get better reception. Conventional CT2 digital communication transceivers that support antenna diversity make decisions about which antenna to use based upon either received signal strength or detected checksum errors.

Unfortunately, there are drawbacks to using received signal strength as a trigger for switching antennas. The drawback results from the effects of delay dispersion caused by selective multipath reflections of signals, and from interference signals. Both delay dispersion and interference signals can comprise substantial amounts of received signal strength, thus "fooling" antenna diversity trigger mechanisms based on received signal strength. This can cause a diversity system to remain coupled to a current antenna selection, when switching to an alternate antenna would likely produce better results.

Using detected checksum errors as a trigger for switching antennas can overcome the aforementioned drawback associated with received signal strength, but introduces a new problem. The new problem results from the amount of time it can take to detect an error. For example, during user communications in the CT2 system, a forty to eighty millisecond period is required to detect a checksum error in a relatively slow signaling data stream that accompanies the user communications. The possible loss of user communications for a corresponding forty to eighty milliseconds before switching to a better antenna can be very objectionable to system users.

Thus, what is needed is a way of controlling antenna diversity that performs well even in the presence of delay dispersion and interference, and that performs quickly enough to switch antennas before a degrading signal can cause an objectionable loss of user communications.

DETAILED DESCRIPTION OF THE PREFERRED EMBODIMENT

Figure 1:
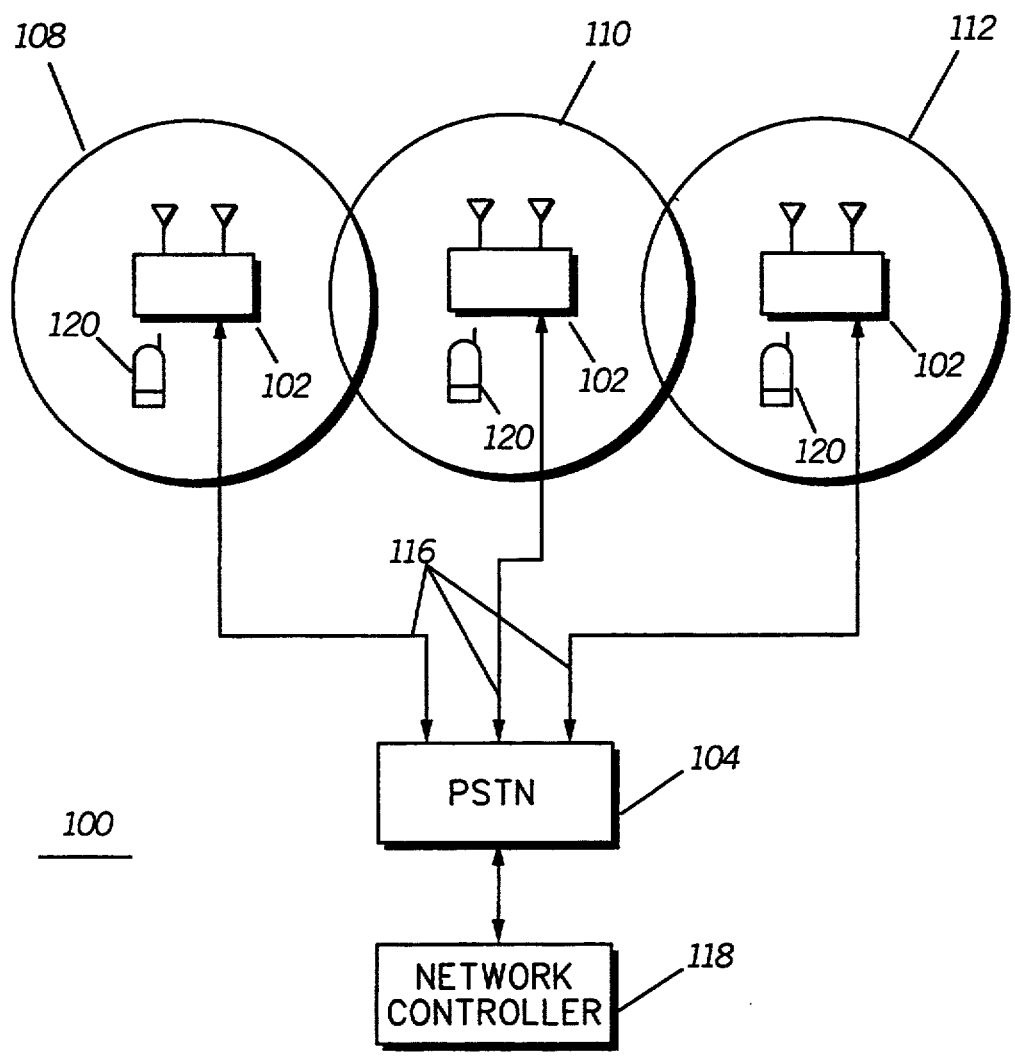
FIG. 1 is a block diagram of a communication system in accordance with the present invention.

Referring now to the drawings and specifically to FIG. 1, there is shown a block diagram of a wireless communication system such as a second generation cordless telephone system (CT2) 100 in accordance with the present invention. System 100 comprises a plurality of fixed communication units (also called call point stations) 102 coupled to a telephone system 104, e.g., a private branch exchange (PBX) or a Public Switched Telephone Network (PSTN). The fixed communication units 102 provide wireless communication coverage within coverage areas 108, 110, 112 for portable communication units 120. The coupling between the fixed communication units 102 and the telephone system 104 is performed by telephone lines 116 for transporting user communications between the portable communication units 120 and the telephone system 104.

Call point stations 102 are also referred to as telepoints or cordless fixed parts (CFPs). CFPs allow persons using the portable telephone handsets 120 (also known as cordless portable parts, CPPs), to access the PSTN 104. Access to the PSTN can occur when a CPP 120 gets in range of a telepoint (CFP) 102 and after the CPP (handset) 120 has established a synchronous link with the CFP (base station) 102.

In a CT2 system, a handset initiating a call to a base station asynchronously transmits on one available channel of the handset's transceiver, which corresponds to a radio frequency (RF) channel in the base station (each base station being capable of supporting up to 40 channels).

In a typical CT2 system, the communication protocol standard includes four main burst structures, called multiplex 3 (MUX 3), multiplex 2 (MUX 2) and multiplex 1 (MUX 1) which is further sub-divided into either multiplex 1.4 or 1.2 (MUX 1.4 or MUX 1.2). MUX 3 is utilized mainly for communication link initiation (link establishment and re-establishment) from a CPP to a CFP. MUX 2 is used primarily for communication link establishment and for link initiation from the base station(CFP). The MUX 1 burst structures (MUX 1.2 and MUX 1.4) are used primarily for voice/data communications, signaling information, and control messages from the CPP (portable) and CFP (base).

For a better understanding of the overall CT2 system communication protocol, one is referred to a publication entitled, "Common air interface specification to be used for the interworking between cordless telephone apparatus in the frequency band 864.1 MHz to 868.1 MHz, including public access services", Version 1.1, dated Jun. 30, 1991, which is published by the European Telecommunications Standards Institute and is hereby incorporated by reference.

In present CT2 systems, all communications occur between the CPPs 120 and CFPs 102, with typically the CPPs initiating the calls to the CFPs, although CFPs can also initiate calls to individual CPPs. Using the CT2 protocol standard (CAI), a cordless handset (CPP)initiating a call, asynchronously transmits using MUX 3 on an available radio frequency channel to the base (CFP), while the base station scans in MUX 3 waiting for a poll by one of the CPPs in the system.

Figure 2:
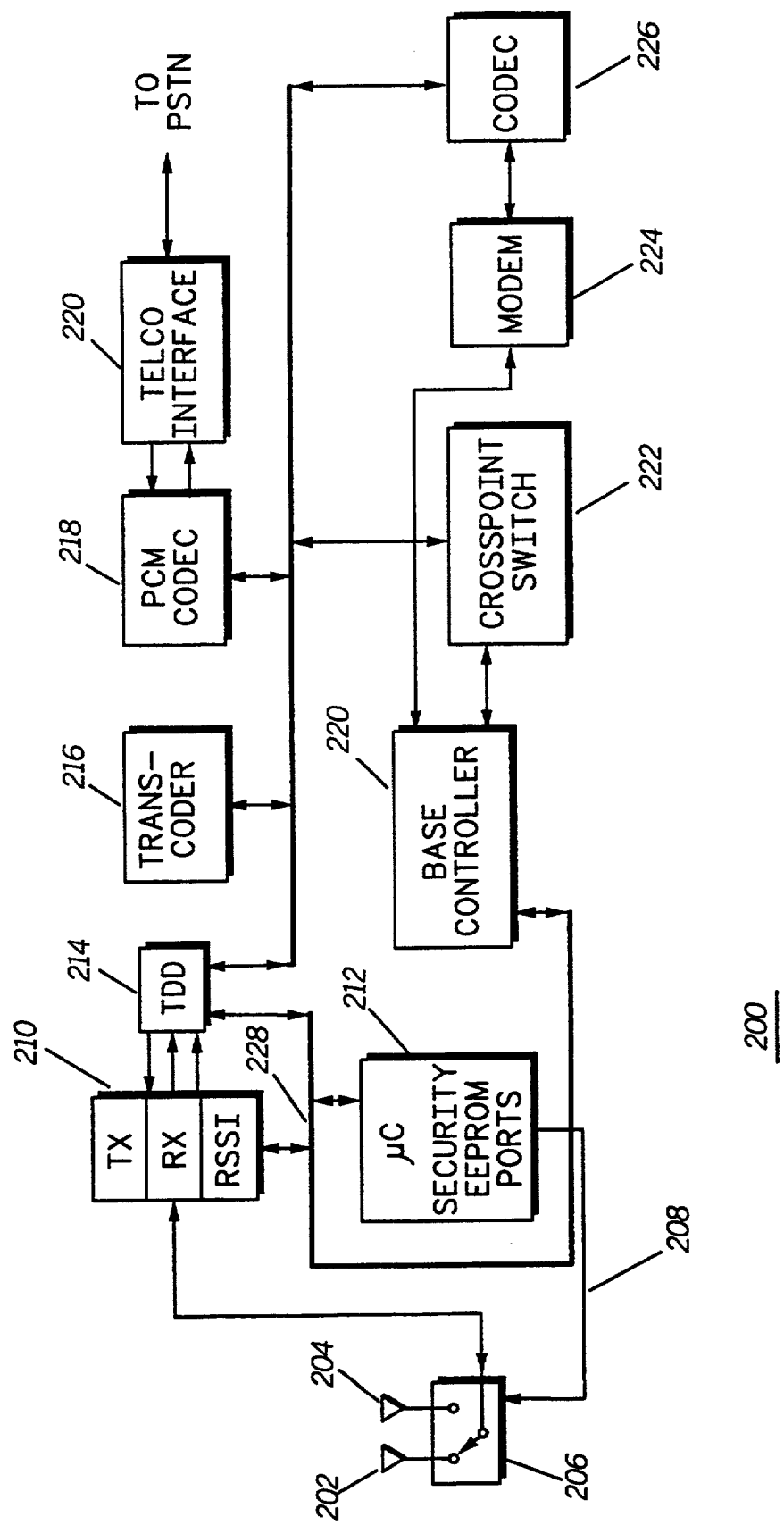
FIG. 2 is a block diagram of a communication device in accordance with the present invention.

With reference to FIG. 2, an electrical block diagram of fixed communication unit 102 in accordance with the preferred embodiment of the present invention comprises first and second antennas 202, 204 coupled to an antenna switch 206. The first and second antennas 202,204 preferably are sufficiently separated in space to provide reception diversity, so that the antenna switch 206 may be controlled as described herein below to select the first or second antenna 202,204 intercepting the better signal at a particular instant of time. Antenna switch 206 selects between antenna 202 and 204 by a control signal sent via line 208 from a control means such as microcomputer 212. The antenna switch 206 is also coupled to a radio frequency (RF) transceiver 210 for transmitting communication signals to and receiving communication signals from the antenna switch 206. The RF transceiver 210 is also coupled to microcomputer 212 which includes stored program control for controlling RF transceiver 210.

The RF transceiver 210 is coupled to a time-division-duplex (TDD) circuit 214 for convening between TDD signaling of the RF transceiver 210 and space-division-duplex signaling of a transcoder 216. Preferably, the TDD circuit 214 performs compatibly with the second generation cordless telephony (CT2) TDD transmit and receive intervals of one millisecond each, although other TDD transmit and receive intervals could be used as easily. The transcoder 216 is coupled to the TDD circuit 214 for convening between adaptive differential pulse code modulation (ADPCM) signaling of the TDD circuit 214 and pulse code modulation (PCM) signaling of a coder/decoder (CODEC) 218 coupled to the transcoder 216 for convening between the digital PCM signaling of the transcoder 216 and the analog signaling of a telephone company (TELCO) interface circuit 220. The TELCO interface circuit 220 is coupled to the CODEC for providing well-known telephone interface functions such as line supervision, incoming call detection, telephone address signaling, etc. Communication station 200 further comprises a base controller 220 which is in charge of controlling communications with network controller 118. Base controller 220 includes appropriate memory such as EEPROM, ROM and RAM for storing information and control software. Base controller 220 controls crosspoint switch 222, modem 224 and codec 226 in order to interchange information between station 200 and network controller 118.

Figure 3:
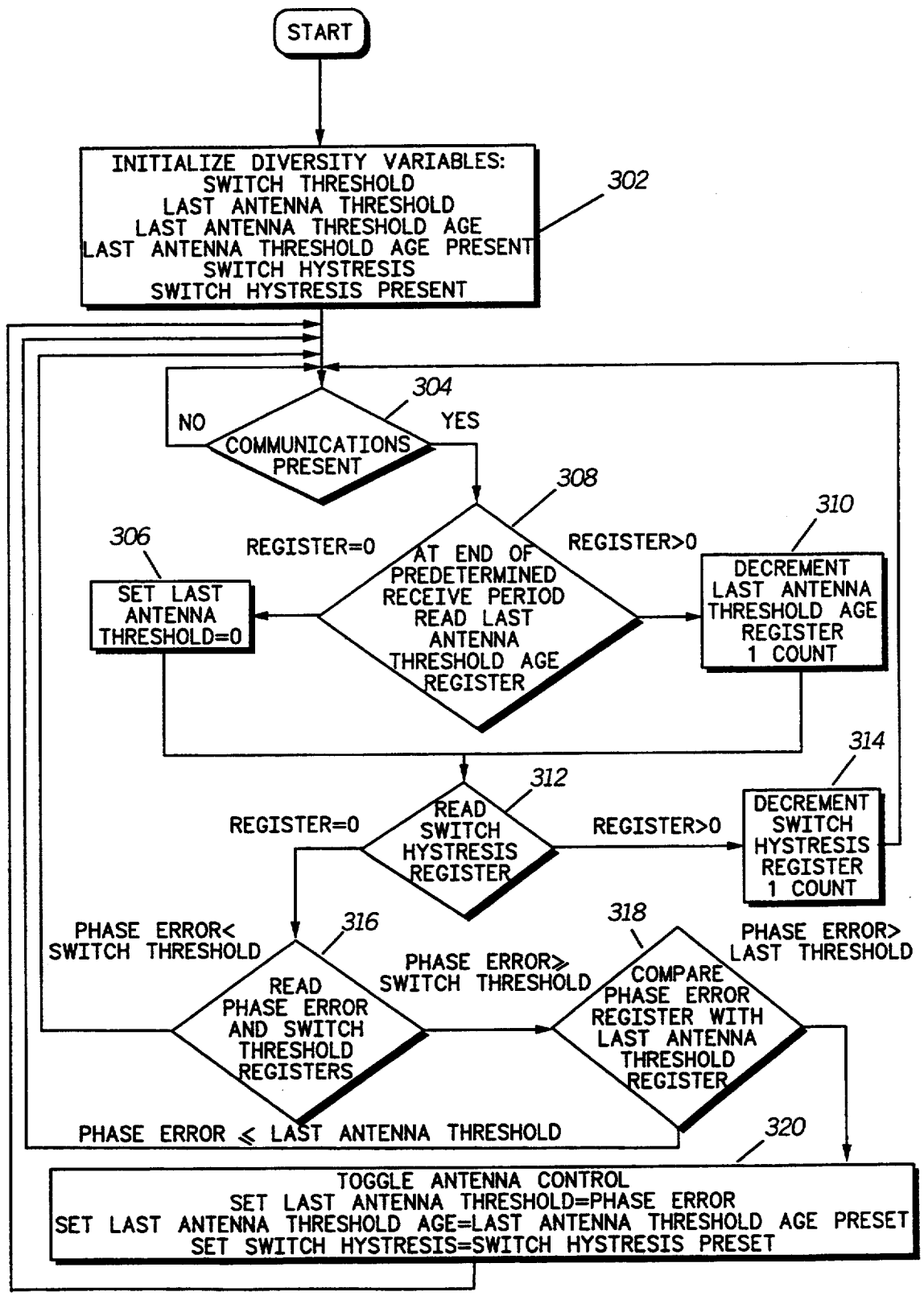
FIG. 3 is a flow chart showing a method for switching antennas in accordance with the present invention.

In FIG. 3, a method for controlling antenna diversity in accordance with the present invention is shown. In step 302, all of the variables associated with the antenna selection program are initialized. The six control variables used in the preferred embodiment consist of variables labeled: switch threshold, last antenna threshold, last antenna threshold age, last antenna threshold age preset, switch hysteresis and switch hysteresis preset. These variables reside in the memory area of controller 212. The switch threshold is the amount of phase error needed to be above in order for the presently selected antenna to be switched. The switch threshold is stored EEPROM space in microcomputer 212 and can be modified. The last antenna threshold is the last threshold level that was present before the presently selected antenna was switched. The last threshold age is the age in frames of the last threshold level. If the age exceeds a predetermined amount, the last antenna threshold is preset.

In step 304, it is determined if communication device 200 is receiving any incoming information packets. In a CT2 system this would require that a communication link have been established and that the communication device be operating in MUX 1.2 or MUX 1.4. If information packets are being received, a receive enable signal is sent from transceiver 210 via bus 228 to microcomputer 212. At the end of the present receive period (falling edge of receive enable signal) the controller reads the value of the last antenna threshold age register in step 308. The last antenna threshold age register is a register located in the memory locations of microcomputer 212 which keeps track of how many packets have been received using the same antenna. For example, in the preferred embodiment if antenna 202 has received 10 packets, the last antenna threshold age register would have a value equal to the last antenna age preset minus 10 if the value of the last antenna age preset is still above zero. If the register equals zero the last antenna threshold is set to equal zero in step 306. However if in step 308 the register has a value greater than zero, the last antenna threshold age register is decremented by one. This action controls the time interval in which the last antenna threshold information is valid.

In step 312, the switch hysteresis register is read. If the register is equal to zero, in step 316, the phase error and switch threshold registers are read. If in step 312, the register is greater than zero, the switch hysteresis register is decremented by one in step 314. This guarantees the system will lock to a new antenna for a minimum period of time defined by the switch hysteresis. This thereby preventing the jumping back between antenna 202 and 204. If in step 316 the phase error value is less than the switch threshold level the routine returns to step 304. However, if the phase error is greater to or equal to the switch threshold the routine moves to step 318. In step 318, the phase error register is compared to the last antenna threshold register. If the phase error value is less than or equal to the last antenna threshold value, the routine moves back to step 304. If in step 318, the phase error value is greater than the last threshold value the routine moves to step 320. Finally, in step 320, the last antenna threshold value is set equal to the phase error value, the last antenna threshold age is set equal to the last antenna threshold age preset, the set switch hysteresis is set equal to the switch hysteresis preset value and microcomputer 212 transmits the antenna switch signal to antenna switch 206 which causes the antennas to switch.

The switch diversity method discussed above uses a phase error register (PHERR register) which is included in TDD 214 in order to develop a signal quality estimate at the end of each frame. The value stored in the PHERR is a fractional value which represents the number of bad bit transitions divided by total number of bit transitions which have occurred in the last receive frame. A bad transition is a transition which falls within a specified window about the center bit sample as determined by the recovered clock. Multiple transitions falling within a bad window will increment the bad and total transition registers by one. Multiple transitions falling within a good window will also increment the bad and total transition registers by one.

The PHERR register is valid, for approximately 1-2 bits after the last B-field data has been received in a CT2 system. The PHERR value is read by microcomputer 212 only if a programmable number of frames have elapsed since the last antenna toggle has occurred. The PHERR value is compared to a first switch threshold value stored in the EEPROM space which is part of microcomputer 212, if required, the previous antenna value stored in the last threshold (if not older than a specified number of frames stored in the last antenna threshold age preset register in EEPROM space). If the PHERR value exceeds both values, the antenna control is toggled. The antenna control signal is synchronized with the receive enable signal (Rx enable) to insure that the antenna is synchronously switched with correct phase alignment to the receive frames. This operation occurs at the end of every receive cycle in MUX1 and should not exceed 800 μs in execution time.

The present invention sets the first diversity threshold below a separate mute threshold in order to command the antenna to switch before a mute condition is reached. Additional registers allow the TDD to be configured for automatically muting independently of the diversity thresholds.

Figure 4:
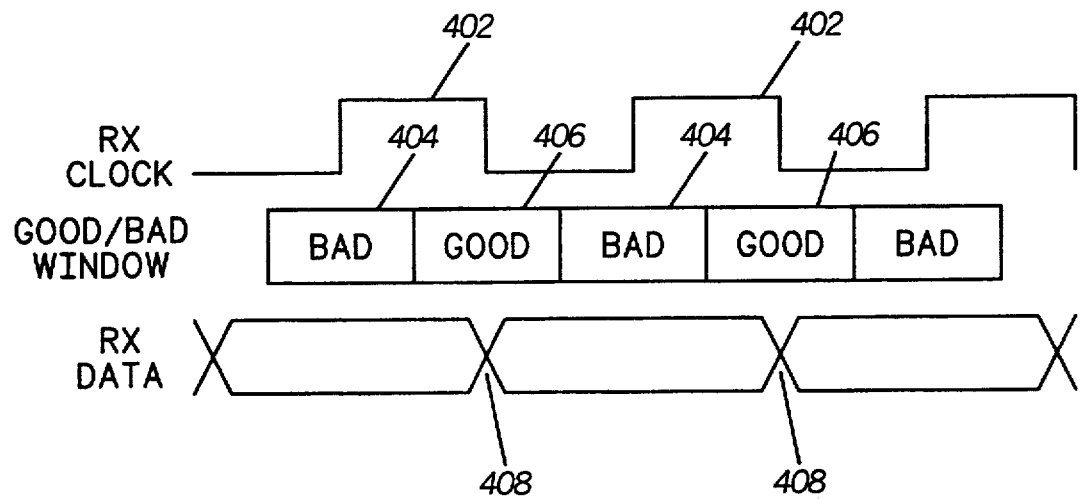
FIG. 4 is a timing diagram showing the receive clock, signal quality windows and the bit transitions of the received signal in accordance with the invention.

In FIG. 4, a timing diagram showing the relationship of the receive clock, signal quality windows and the bit transitions of the received signal in accordance with the invention are shown. The reference clock signal (RX CLOCK) is generated by TDD 214. The RX clock signal provides synchronization with incoming transmissions to base station 102. The RX clock is generated by a phase-lock-loop circuitry which is part of TDD 214. The present invention provides for a way of predicting the quality of the incoming received signals by generating a set of valid (good) 406 and invalid (bad) 404 time windows. The "good" signal time windows 406 being centered about the negative edge (voltage level change) of the receive clock. The number of incoming bit transitions 408 which fall in ( it get also be done as easily by calculating the number of bits falling outside of the predetermined time windows) the "good" 406 and "bad" 404 windows helps base station 102 determine when to switch the antennas in order to attempt to get better reception.

The base station in the preferred embodiment determines the number of bit transitions 408 which occur during bad windows 404 and divides this number by the total number of transitions that have occurred during a predetermined period of time (e.g., one receive cycle, which in a CT2 system comprises 66 total bits made up of 64 "B" field bits and 2 "D" field bits). In the preferred embodiment, the base station calculates the percentage based on the 64 "B" field bits for each frame. As the phase error of the received signal begins to increase, the number of bit transitions occurring in the bad windows 404 increases, causing the percentage of bad transitions to total transitions to increase accordingly.

Once the percentage of bad transitions over total transitions increases to a predetermined amount (the PHERR is greater than switch threshold and the last threshold), controller 212 generates an antenna switch signal which is sent via line 208 to antenna switch 206. The antenna switch signal informs switch 206 to switch antennas. Although the preferred embodiment shows only two antennas 202 and 204, communication device 200 can include more than two. TDD 214 (shown in FIG. 1) can adjust the size of the bad 404 and good windows with respect to each other, depending on the particular conditions. For example, the size of the good window size to bad window size can be increased or decreased depending on what type of antenna switching characteristics the system requires.

Figure 5:
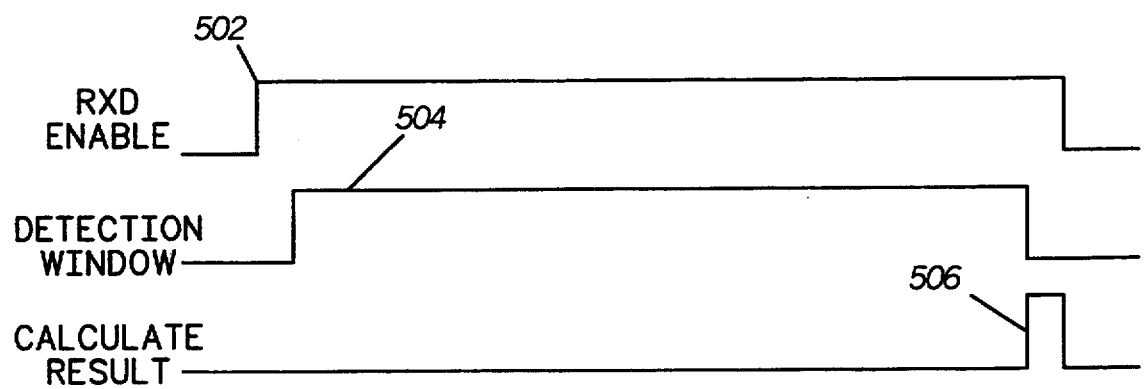
FIG. 5 is a timing diagram showing a detection window, the time the calculation of the signal quality and the antenna switch decisions are made in accordance with the present invention shown.

In FIG. 5, a timing diagram showing when the detection window, the calculation of the signal quality and the antenna switch decisions are made in accordance with the present invention are shown. The receive data enable (RXD ENABLE) line goes high in TDD 214 upon base station 200 beginning to receive a packet. The detection window 504 goes high upon the 64 bits of "B" channel data received. At the end of the detection window, TDD 214 determines the percentage of bad transitions that have occurred in the packet in time labeled 506. Finally, after time 506, after the calculation has been made, microcomputer 212 compares the calculated value which is stored in register PHERR to a value stored in memory and sends out the necessary antenna switch signal if required.

In summary, the present invention provides an optimum method and apparatus for controlling a switched antenna system which is effective under either C/I (carrier to interference) or C/N (carrier to noise) channel deterioration. The signal quality based switch threshold of the present invention switches the antenna prior to bit error detection in order to reduce link interruptions present in existing diversity implementations. By providing the frame-based signal quality detection combined with the optimum switch control method provides for an improvement over present switch diversity systems.

What is claimed is:

1. A method for selecting one of at least two antennas in a communication unit, the method comprising the steps of:

receiving during a receiving period a signal from a currently selected one of the at least two antennas, the signal transmitted in a communications format comprising a plurality of bits having bit transitions;

generating a reference clock signal based on the received signal;

determining whether some of the bit transitions fall within a predefined time window corresponding to each transition, the predefined time window is determined by the reference clock signal;

determining the quality of the incoming signal based on the number of bit transitions that fall outside of the predefined window;

selecting for a subsequent receiving period one of the at least two antennas in response to the quality of the incoming signal; and wherein the step of determining the quality of the incoming signal, comprises the sub-steps of:

determining the total number of bit transitions that have occurred in the receive period;

determining the number of bit transitions during the receiving period which have fallen outside of the predefined window; and calculating the percentage of bit transitions which fall outside of the predefined window from the total number of bit transitions.

2. A method as defined in claim 1, wherein the step of selecting for a subsequent receiving period one of the at least two antennas in response to the quality of the incoming signal, further comprises:

comparing the percentage of bit transitions which fall outside of the predefined windows to a predefined value in order to determine whether to switch to the antenna from the at least two antennas which is currently not selected.

3. A method as defined in claim 2, further comprising the step of:

determining the percentage of bit transitions which fall outside of the predefined windows over a predetermined number of receiving periods before deciding whether or not to switch antennas.

4. A method as defined in claim 2, further comprising the steps off:

determining whether more than one bit transition occurs in any of the predefined windows; and counting the occurrence of every bit transition beyond the first bit transition in the predefined window as if the bit transitions occurred outside of the predefined windows.

5. A method for selecting one of at least two antennas in a communication unit, the method comprising the steps of:

receiving during a receiving period a signal from a currently selected one of the at least two antennas, the signal transmitted in a communications format comprising a plurality of bits having bit transitions;

generating a reference clock signal based on the received signal;

determining whether some of the bit transitions fall within a predefined time window corresponding to each transition, the predefined time window is determined by the reference clock signal;

determining the quality of the incoming signal based on the number of bit transitions that fall outside of the predefined window;

selecting for a subsequent receiving period one of the at least two antennas in response to the quality of the incoming signal; and maintaining the currently selected antenna when the currently selected antenna has been selected within a predetermined period of time.

6. A method for selecting one of at least two antennas in a communication unit, the method comprising the steps of:

receiving during a receiving period a signal from a currently selected one of the at least two antennas, the signal transmitted in a distal communications format comprising at least one bit having a bit transition;

generating a reference clock signal based on the received signal, the reference clock signal having at least one level change;

determining whether the at least one bit transition in the receiving period falls within a predefined time window determined by the least one reference clock level change;

determining the quality of the incoming signal based on whether the at least one bit transition falls within the predefined time window;

selecting for a subsequent receiving period one of the at least two antennas when the at least one bit transition has fallen outside of the predefined window;

determining the length of time the presently selected antenna has been selected; and maintaining the currently selected antenna when the currently selected antenna had been selected within a predetermined period of time.

7. A method as defined in claim 6, further comprising the steps of:

determining the quality of the received signal using a previously selected antenna; and comparing the quality of the received signal using the presently selected antenna with the quality of the received signal as previously determined using the previously selected antenna and selecting for a subsequent receiving period the antenna which is not currently selected when the quality of the received signal using the presently selected antenna is worse than the quality of the received signal as previously determined using the previously selected antenna.

8. A method for selecting one of at least two antennas in a communication unit, the method comprising the steps of:

receiving during a receiving period a signal from a currently selected one of the at least two antennas, the signal transmitted in a digital communications format comprising at least one bit having a bit transition;

generating a reference clock signal based on the received signal, the reference clock signal having at least one level change;

determining whether the at least one bit transition in the receiving period falls within a predefined time window determined by the least one reference clock level change;

determining the quality of the incoming signal based on whether the at least one bit transition falls within the predefined time window;

selecting for a subsequent receiving period one of the at least two antennas when the at least one bit transition has fallen outside of the predefined window; and selecting for a subsequent receiving period one of the at least two antennas when two or more bit transitions have fallen within the predefined window.

9. An apparatus for selecting one of at least two antennas in a communication unit for use in a wireless communication system, the apparatus comprising:

receiver means for receiving during a receiving period a signal from a currently selected one of the at least two antennas, the signal comprising a communications format comprising a plurality of data bits having bit transitions;

antenna switch coupled to the receiver means and to the at least two antennas for coupling a selected one of the at least two antennas to the receiver means;

reference clock generator coupled to the receiver for generating a reference signal based on the received signal;

determination means coupled to the reference clock generator and receiver means for determining when some of the bit transitions fall within predefined time windows, one predefined time window corresponding to each of the bit transitions;

a controller coupled to the receiver means for determining the quality of the incoming signal based on the number of bit transitions that fall within the predefined windows;

the antenna switch responsive to the controller for selecting for a subsequent receive period one of the at least two antennas in response to the quality determination performed by the controller; and the controller maintains the currently selected antenna as the antenna coupled to the receiver means when the currently selected antenna has been selected within a predetermined period of time.

10. An apparatus for selecting one of at least two antennas in a communication unit for use in a wireless communication system, the apparatus comprising:

receiver means for receiving during a receiving period a signal from a currently selected one of the at least two antennas, the signal comprising a communications format comprising a plurality of data bits having bit transitions;

antenna switch coupled to the receiver means and to the at least two antennas for coupling a selected one of the at least two antennas to the receiver means;

reference clock generator coupled to the receiver for generating a reference signal based on the received signal;

determination means coupled to the reference clock generator and receiver means for deterring when some of the bit transitions fall within predefined time windows one predefined time window corresponding to each of the bit transitions;

a controller coupled to the receiver means for determining the quality of the incoming signal based on the number of bit transitions that fall within the predefined windows;

the antenna switch responsive to the controller for selecting for a subsequent receive period one of the at least two antennas in response to the quality determination performed by the controller;

the controller maintains the currently selected antenna as the antenna coupled to the receiver means when the currently selected antenna has been selected within a predetermined period of time; and the apparatus is a second generation cordless telephone (CT2) base station.

* * * * *

UNITED STATES PATENT AND TRADEMARK OFFICE
CERTIFICATE OF CORRECTION

PATENT NO.   : 5,430,769
DATED        : July 4, 1995
INVENTOR(S)  : Patsiokas et al.

It is certified that error appears in the above-indentified patent and that said Letters Patent is hereby corrected as shown below:

In claim 4 at column 7, line 10: please replace "off" with --of--.

In claim 6 at column 7, line 44: please replace "distal" with --digital--.

In claim 4, at column 7, line 9, replace "2" with --1 --.

Signed and Sealed this

Sixteenth Day of January, 1996

Attest:

BRUCE LEHMAN

*Attesting Officer*   *Commissioner of Patents and Trademarks*